United States Patent [19]

Veneski

[11] Patent Number: 4,661,901
[45] Date of Patent: Apr. 28, 1987

[54] MICROPROCESSOR CONTROL SYSTEM UTILIZING OVERLAPPED PROGRAMMABLE LOGIC ARRAYS

[75] Inventor: Gerard A. Veneski, Boca Raton, Fla.

[73] Assignee: International Business Machines Corporation, Armonk, N.Y.

[21] Appl. No.: 452,526

[22] Filed: Dec. 23, 1982

[51] Int. Cl.$^4$ .......................... G06F 9/16; G06F 7/00
[52] U.S. Cl. .................................................. 364/200
[58] Field of Search ............................... 364/200, 900

[56] References Cited

U.S. PATENT DOCUMENTS

| | | | |
|---|---|---|---|
| 3,959,774 | 5/1976 | Mead | 364/200 |
| 4,173,041 | 10/1979 | Dvorak et al. | 364/200 |
| 4,195,352 | 3/1980 | Tu et al. | 364/900 |
| 4,357,678 | 11/1982 | Davis | 364/900 |
| 4,482,953 | 11/1984 | Burke | 364/200 |

Primary Examiner—Gareth D. Shaw
Assistant Examiner—Daniel K. Dorsey
Attorney, Agent, or Firm—Sughrue, Mion, Zinn, Macpeak, and Seas

[57] ABSTRACT

A microprogrammed data processor in which the average processing speed is significantly enhanced by very rapidly processing system-initiated control operations using multiplexed programmable logic arrays. A wide input system encoding programmable logic array (270) responds to input signals which instruct system-initiated control operations, such as interrupts, power failure shut-down operations, system reset operations, ets., to produce internal exception condition opcodes. These opcodes are applied to inputs of a plurality of system decode programmable logic arrays (251-254) which, in response to the opcodes, generate sequences of microwords for executing the system-initiated control operations. The system decode programmable logic arrays (251-254) are activated sequentially and cyclically to generate the sequences of microwords used to carry out each of the control operations. The outputs of the system decode programmable logic arrays are multiplexed onto two data buses (214, 218), and the microwords on the two data buses (214, 218) are alternately decoded to produce control point signals used to directly control the operations of internal processor operational elements such as the arithmetic logic unit, registers, counters and the like.

7 Claims, 7 Drawing Figures

SYSTEM INITIATED CONTROL OPERATIONS MICROWORD PROCESSOR, 280

MICROPROCESSOR CONTROL SYSTEM UTILIZING OVERLAPPED PROGRAMMABLE LOGIC ARRAYS

TECHNICAL FIELD

The present invention relates to a microword control system for use in controlling a microprocessor in which sequences of microwords are used to control the execution of each processor instruction and to control the execution of internally initiated control operations. The invention is particularly useful in data processors and digital computers in which the principal circuit sections are formed on large scale integration (LSI) integrated circuit chips.

In a microprogrammed digital computer or data processor, microwords are read from an internal storage unit to provide the internal processor control actions which are needed to execute the processor instructions obtained from the user's software program. The microwords are read from the storage unit and set into a control register one at a time. Each microword consists of multiple binary bits, some or all of which may be organized into plural-bit control groups or control fields. The control register drives a decoder mechanism which produces the elemental control point signals which, in turn, control the various data flow gates and data manipulation mechanisms located in the data processor. Each microword controls the internal operation of the data processor for one microword cycle. Several microwords are normally needed to execute a processor instruction. Some processor instructions require only a few microwords while others require many microwords to complete their execution.

BACKGROUND ART

A good example of a microprogrammed data processor is described in U.S. Pat. No. 4,173,041, issued on Oct. 30, 1979, to T. J. Dvorak et al. As indicated in this Dvorak et al. patent, the microwords may be located in a separate storage unit called a "control storage" or they may be located in a portion of the processor main storage unit which is set aside for the exclusive use of the microwords. For the case of separate storage units, these units may be of either the read/write type or of the read only type. In smaller data processors, the current trend is to store the microwords in a so-called read-only storage (ROS) unit. In any event, the microword storage units currently used are of the random access type and include the customary addressing circuitry for addressing any desired one of the storage locations in the storage unit.

The current trend is to fabricate the principal circuit sections of a data processor, including the microword control storage section, on large scale integration (LSI) integrated circuit chips. The overall objective is to increase the number of data processing functions that can be provided on a single integrated circuit chip, with the ultimate goal of providing a complete data processor or digital computer on a single chip. Currently, the best technology for packing the largest number of circuits onto a single chip is the so-called metal oxide semiconductor field effect transistor (MOSFET) technology. Such technology makes possible a very high circuit density on an integrated circuit chip. Unfortunately, MOSFET circuits have a somewhat slower operating speed than do circuits fabricated by means of other integrated circuit technologies, such as, for example, the so-called bipolar integrated circuit technology. Thus, it is desirable to find ways to increase the operating speed of data processor mechanisms which employ MOSFET circuits. This is particularly true of the microword control storage section of the data processor because this section provides the elemental control signals for the remainder of the data processor.

Commonly assigned U.S. patent application Ser. No. 350,660, filed Feb. 22, 1982, entitled "Microword Control System Utilizing Multiplexed Programmable Logic Arrays", the inventors being V. S. Moore et al., describes a microword control system wherein the customary random access storage unit and its addressing circuitry are replaced by a plurality of time multiplexed programmable logic arrays (PLA's). Each of the PLA's produces one or more of the microwords needed to execute any given processor instruction. In this system, the access times of at least some of the programmable logic arrays are overlapped so that new microwords become available at a faster rate than for the case of a single programmable logic array.

The multiplexing of the microwords from the different ones of the programmable logic arrays is controlled primarily by the microwords themselves. Each microword is provided with a plural-bit PLA strobe field which is coded to identify the PLA from which the next microword is to be obtained. Two sets of the PLA's may be provided, with each set operating in the manner described. Control point signals derived from the two sets of microwords are time multiplexed to take turns in controlling the operation of the data processor.

Figure 1:
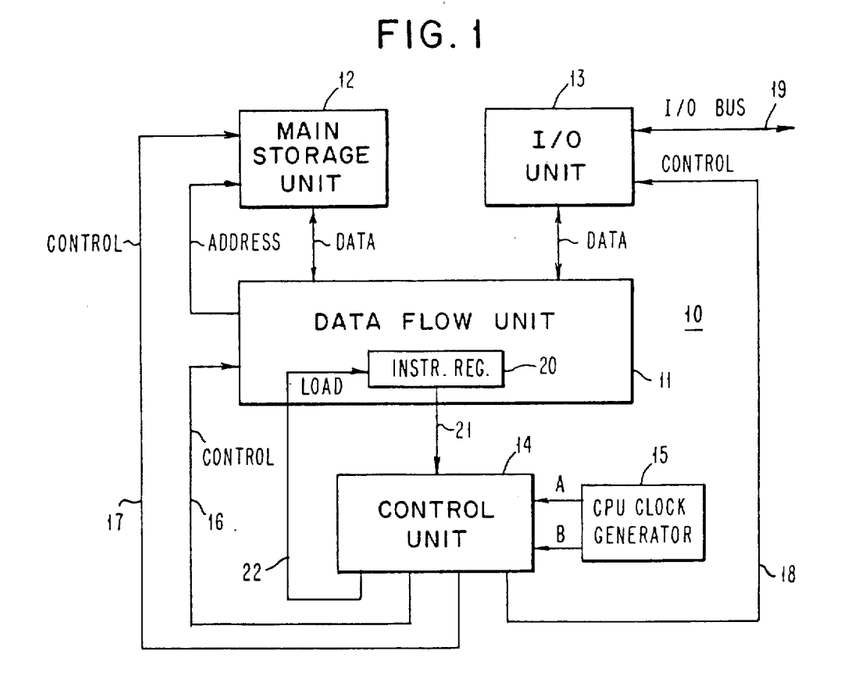
FIG. 1 is a functional block diagram of a digital data processor in which the microword control system of the invention may be used to advantage.

The microword control system of the commonly assigned application will now be discussed in detail. Referring now to FIG. 1, there is shown a functional block diagram of a digital computer or digital data processor 10 which is particularly suitable for fabrication on an LSI type integrated circuit chip. This data processor 10 includes a data flow unit 11, a main storage unit 12, an input/output (I/O) unit 13, a control unit 14 and a CPU (central processing unit) clock generator 15. The data flow unit 11 is sometimes called a central processing unit and includes such things as an arithmetic and logic unit (ALU), various hardware registers and counters, a local storage unit and a bus system interconnecting these items with one another. The data flow unit 11 is the unit that does the adding, subtracting, rearranging and other manipulation of the data to produce the desired results.

The control unit 14 controls the operation of the data flow unit 11, the main storage unit 12, and the I/O unit 13 by means of various control point signals which are supplied by way of respective multi-line control buses 16, 17 and 18 to the various functional elements located in these units 11, 12 and 13. Control unit 14 includes a microword generation mechanism for producing a sequence of microwords for each processor instruction to be executed. These microwords, in turn, produce the control point signals which control the elemental operations in the other data processor units.

The data flow unit 11, the I/O unit 13 and the control unit 14 can all be fabricated on one and the same integrated circuit chip.

The user program to be performed by the data processor 10 is initially loaded into the main storage unit 12 from one of the peripheral units (not shown) coupled to the I/O unit 13 by way of an I/O bus 19. This initial loading is accomplished by way of the data flow unit 11.

After such initial loading, the user program is performed by reading from the main storage unit 12 in a sequential manner the various processor instructions which make up the user program. Each processor instruction, in its turn, is read out of the main storage unit 12 and loaded into an instruction register 20 located in the data flow unit 11. The processor instruction resident in the instruction register 20, or at least the effective operation code portion thereof, is supplied to the control unit 14 by way of a multi-line bus 21 to identify to the control unit 14 the particular processor instruction to be executed.

In some processors, only a portion of the complete processor instruction may be loaded into the instruction register 20. In such cases, the portion loaded into the instruction register 20 includes at least the "effective" operation code portion of the instruction. By "effective" operation code is meant all the bits in the processor instruction which are needed to uniquely define the kind of operation to be performed by the processor instruction. This does not include operand address bits and length count bits but does include function bits and modifier bits which are needed to complete the definition of the operation to be performed.

Loading of a new processor instruction into the instruction register 20 is accomplished by way of a control point signal which is supplied by way of a control line 22 to a load control terminal of the instruction register 20.

Figure 2:
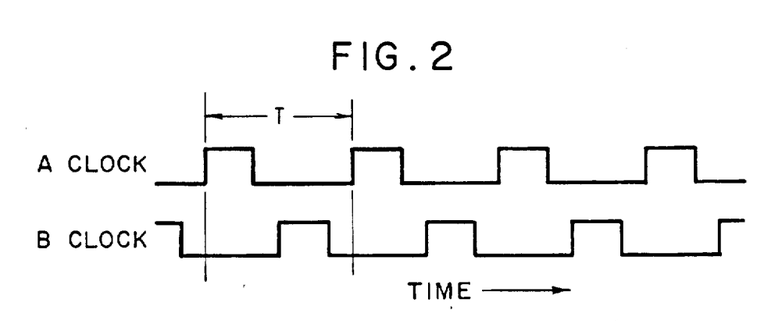
FIG. 2 is a timing diagram used in explaining the operation of the data processor of FIG. 1.

The timing of the operations taking place within the control unit 14 is controlled by the CPU clock generator 15. This clock generator 15 is a two-phase non-overlapping clock generator. It generates the A phase and the B phase clock signals as shown in FIG. 2. Both of these clock signals are of the same frequency and have the same waveshape, the difference being that they are displaced in time relative to one another. The positive pulses of the A clock do not overlap with the positive pulses of the B clock. The amount of non-overlap shown in FIG. 2 is exaggerated for purposes of clarity. These positive pulses represent the active intervals for the two clock signals.

Figures 3, 31:
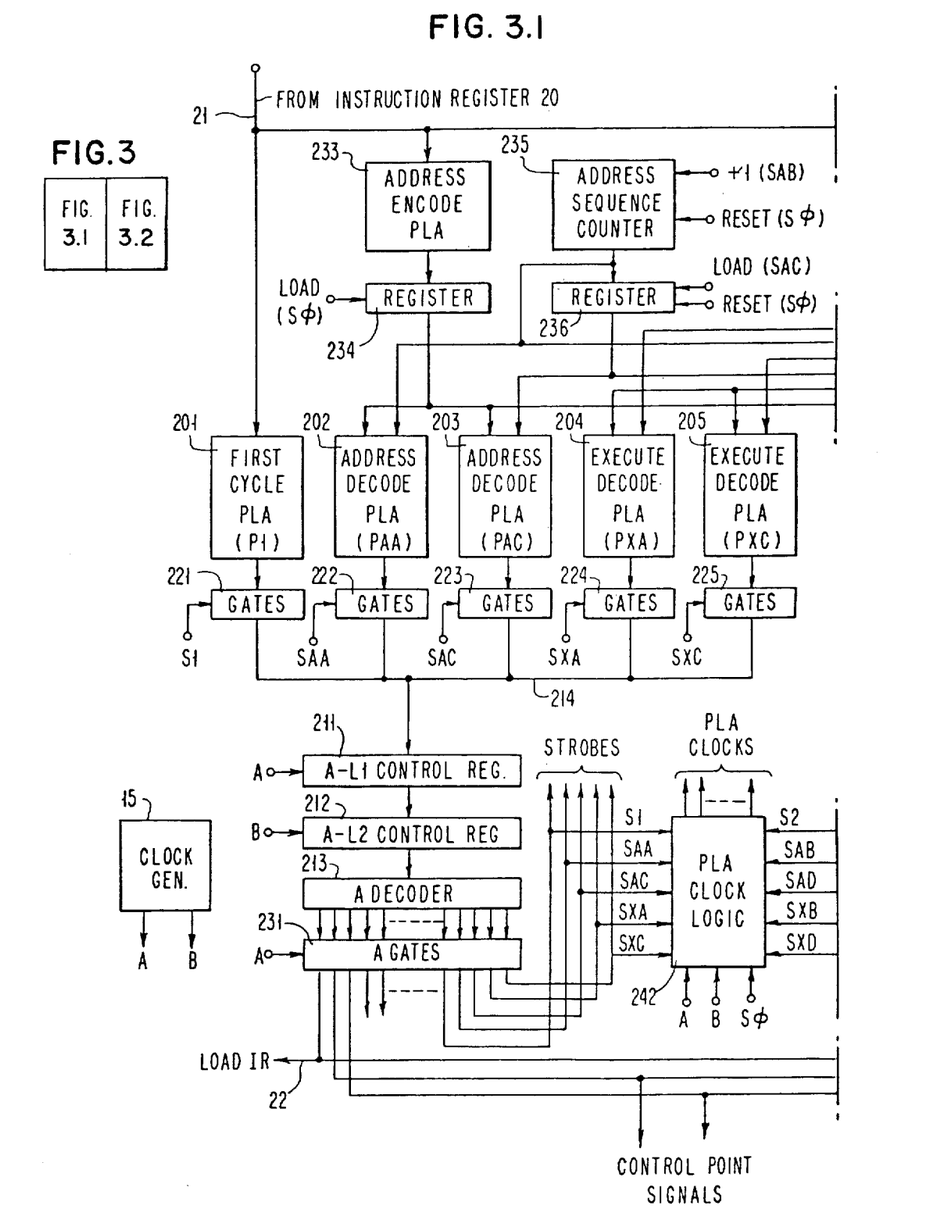

Referring to FIG. 3, there is shown a functional block diagram of microword control system which may be used as the control unit 14 in the FIG. 1 data processor.

The microword control system of FIG. 3 includes first and second sets of PLA mechanisms wherein each PLA mechanism is responsive to the processor instruction to be executed for producing at least one of the microwords needed to execute such instruction. The first set of PLA mechanisms includes a first cycle PLA 201, effective address decode PLA's 202 and 203, and execute decode PLA's 204 and 205. For simplicity, the first set of PLA's will sometimes be referred to by the acronyms P1, PAA, PAC, PXA and PXC, respectively. The second set of PLA mechanisms includes a second cycle PLA 206, effective address decode PLA's 207 and 208 and execute decode PLA's 209 and 210. For simplicity, the second set of PLA's will sometimes be referred to by the acronyms P2, PAB, PAD, PXB and PXD respectively.

Each of these PLA's 201-210 is a dynamic or clocked PLA. For a detailed description of the internal structure thereof, reference may be made to FIG. 8 and the accompanying description in the above-referenced patent application Ser. No. 350,660. Each employs internal C1, C2, C3 and C4 clocking pulses for controlling the internal operations therein.

The microword control unit of FIG. 3 further includes first and second control mechanisms for respectively receiving the microwords from the first and second sets of PLA mechanisms for producing for each microword at least one control point signal for controlling the operation of the data processor. The first control mechanism includes an A-L1 control register 211, an A-L2 control register 212 and an A decoder 213 for receiving the microwords from the first set of PLA's 201-205 via a first PLA output bus 214. The second control mechanism includes a B-L1 control register 215, a B-L2 control register 216 and a B decoder 217 for receiving the microwords from the second set of PLA's 206-210 via a second PLA output bus 218.

The control unit of FIG. 3 also includes first multiplexing circuitry for transferring microwords one at a time from the different ones of the PLA's 201-205 in the first set to the first control mechanism 211-213. This first multiplexing circuitry includes a plurality of selectively operable output buffers (gates) 221-225 for individually coupling the outputs of the different PLA's 201-205 to the input of the A-L1 control register 211 via the PLA output bus 214. These buffers or gates 221-225 are selectively enabled by respective ones of PLA strobes S1, SAA, SAC, SXA and SXC, which PLA strobes are obtained from the output of the A decoder 213. Only one of the strobe signal lines S1, SAA, SAC, SXA and SXC is activated during any given microword cycle, the particular strobe line which is activated being determined by the coding of the PLA strobe field of the microword resident in the A-L2 control register 212.

The control unit of FIG. 3 further includes second multiplexing circuitry for transferring microwords one at a time from different ones of the PLA's 206-210 in the second set to the second control mechanism 215-217. This second multiplexing circuitry includes a plurality of selectively operable output buffers (gates) 226-230 for individually coupling the outputs of the different PLA's 206-210 to the input of the B-L1 control register 215 via the PLA output bus 218. These buffers or gates 226-230 are selectively enabled by respective ones of PLA output strobes S2, SAB, SAD, SXB and SXD which are obtained from the output of the B decoder 217. Only one of these strobe signal lines S2, SAB, SAD, SXB and SXD will be activated during any given microword control cycle, the particular strobe line which is activated being determined by the coding of the PLA strobe field of the microword resident in the B-L2 control register 216 for that particular control cycle.

The microword control system of FIG. 3 further includes third multiplexing circuitry for interleaving the control point signals produced by the first control mechanism 211-213 with the control point signals produced by the second control mechanism 215-217 so that these two control mechanisms take turns in controlling the operation of the data processor. This third multiplexing circuitry includes a multi-stage set of A gates 231 for the A decoder 213 and a multi-stage set of B gates 232 for the B decoder 217. A gates 231 are periodically enabled by the positive A clock pulses from the clock generator 15, while the B gates 232 are periodically enabled by the positive B clock pulses from the clock generator 15. Thus, the control point signals from the A decoder 213 control the data processor during the A clock pulse intervals and the control point signals from the B decoder 217 control the data processor during the B clock pulse intervals. In this manner, the control point signals from the two decoders 213 and 217 are interleaved to take turns in controlling the data processor.

The first and second cycle PLA's 201 and 206 are driven directly from the instruction register 20 in the data processor of FIG. 1. This enables them to react very quickly to new processor instructions. The set of four effective address decode PLA's 202, 203, 207 and 208, on the other hand, receive their processor instruction dependent inputs by way of an effective address encode PLA 233 and a register 234. For simplicity, the encode PLA 233 is assumed to be a static PLA. In response to the processor instruction received via bus 21, encode PLA 233 produces an instruction identification (ID) number having a lesser number of bits than does the processor instruction supplied to the input of the encode PLA 233 by way of the bus 21. This instruction ID number is loaded into the register 234 by an S∅ restart pulse obtained at the appropriate moment from the output of the B decoder 217. The instruction ID number in register 234 is supplied in parallel to a first set of inputs of the AND array potions in each of the effective address decode PLA's 202, 203, 207 and 208.

An effective address sequence counter 235 and a sequence count register 236 supply the sequences of number signals to the second sets of inputs for the AND array portions of the effective address decode PLA's 202, 203, 207 and 208. Sequence counter 235 is reset to a zero condition by the same S∅ restart pulse that loaded the encode PLA output register 234. Depending upon the number of microwords needed from the address decode PLA's, the address sequence counter 235 is incremented one or more times by the SAB strobe pulses obtained from the B decoder 217. The sequence count value in counter 235 is supplied directly to the second sets of inputs of the address decode PLA's 202 and 207. It is supplied by way of register 236 to the second inputs of the other two address decode PLA's 203 and 208. Register 236 is reset to zero by the S∅ restart pulse and is loaded with the sequence count value from counter 235 by the SAC strobe pulse obtained from the A decoder 213.

The set of four execute decode PLA's 204, 205, 209 and 210 are driven in a similar manner by an execute encode PLA 237 and an execute sequence counter 238. The execute encode PLA 237 produces an instruction ID number which is loaded into register 239 by the S∅ restart pulse. This instruction ID number is supplied to the first inputs of each of the execute decode PLA's 204, 205, 209 and 210. The execute sequence counter is reset to a zero value by the S∅ restart pulse and is incremented one or more times by SXB strobe pulses obtained from the B decoder 217. The sequence count numbers from the counter 238 are supplied directly to the second inputs of the execute decode PLA's 204 and 209. They are supplied to the second inputs of the other two execute decode PLA's 205 and 210 by way of register 240. For this embodiment, the execute encode PLA 237 is also assumed to be a static PLA.

The internal C1, C2, C3 and C4 timing pulses for each of the various dynamic PLA's 201-210 are derived from PLA clock signals PC1-PC16 produced by PLA clock logic 242. A different set of four of these PLA clock signals PC1-PC16 is supplied to each of the PLA's 201-210. The first cycle PLA 201, for example, receives the PLA clock signals PC1-PC4. These clock signals PC1-PC4 provide the internal timing signals C1-C4, respectively, needed within the P1 first cycle PLA 201.

The PLA clock logic 242 receives as input signals the various PLA output strobes S1, S2, SAA, SAB, SAC, SAD, SXA, SXB, SXC, and SXD. It further receives as input signals the positive A and B clock pulses from the clock generator 15 and the S∅ restart pulse from the B decoder 217. The PLA clock logic 242 includes therein various combinatorial logic circuits which make use of these various input signals to produce the PLA clock signals PC1-PC16.

Following completion of the effective address calculation sequence of microwords, the execute decode PLA's 204, 205, 209 and 210 become operative to produce a sequence of "execute" microwords PXA, PXB, PXC, PXD, PXA, PXB, . . . , which are, in general, effective to "execute" the processor instruction, that is, to perform the desired operand manipulation or manipulations called for by the processor instruction. After the operand manipulations, the last few "execute" microwords may be used to perform any housekeeping chores that may need to be done to complete the overall microword sequence and to prepare for the coming of the next processor instruction.

The exact number of microwords in the effective address portion of the overall sequence will, in general, be different for different processor instructions. In a similar manner, the exact number of microwords in the execute portion of the overall sequence will also be different for different processor instructions. The last microword in the effective address segment to drive the A decoder 213, in this example, the microword 245, will produce a PLA strobe SXA to select the PXA decode PLA 204 to be the source of the next microword for the A decoder 213. In a similar manner, the last microword in the effective address segment to drive the B decoder 217, in this case, the microword 246, will produce a PLA strobe SXB to select the PXB decode PLA 209 to provide the next microword for the B decoder 217. This accomplishes the switch-over from the effective address segment to the execute segment of the microword sequence. Thereafter, and up until the last two microwords in the execute segment, the microword from each execute decode PLA produces a PLA strobe which selects the next execute decode PLA which is to supply the microword for its respective control register and decoder mechanism. The last A decoder microword in the execute segment, in this example, the microword 247, produces a PLA strobe S1 for selecting the first cycle PLA 201. In a corresponding manner, the last B decoder microword in the execute segment, in this example, the microword 248, produces a PLA strobe S2 for selecting the second cycle PLA 206. In this manner, the last two microwords for the current processor instruction select the sources of the first two microwords for the next processor instruction to be executed.

The distinction between the processor control actions provided by the effective address microwords and the execute microwords is not a hard and fast one. For example, for some processor instructions some of the effective address calculation microwords may, in fact, be performing functions which are more properly classified as execute functions. In other cases, some of the execute microwords may be performing functions which might more properly be grouped with the effective address functions. One reason for not adhering to a strict segregation of functions is to even out the distribution of the microwords so that all of the address and execute decode PLA's may be of approximately the same physical size. This keeps any one of these PLA's from becoming much larger in size than the remainder of the PLA's.

Although the above described microword control system does in fact very significantly increase the operating speed of the data processor in which it is utilized, nevertheless, it would be desirable to still further increase the overall processing speed. Particularly, with the significant increases in processing speed brought about by the above-described microword control system, it has been found that a large portion of the overall operating time of the data processor employing the microword control system is taken up by internally generated, that is, system-initiated, control operations. Examples of such operations are stop, wait and load, error check, program check, machine check, stop-on-error, check-restart, interrupt-request, reset-interrupt, I/O interrupt, power failure, or over-temperature shutdown, system reset, initial program loading (IPL) and power reset. The processing of such control operations has heretofore been handled in a conventional manner. For instance, a table of instructions may be stored in a read-only memory for each internally generated control operation, the set of instructions accessed each time that one of the internally generated control operations is to be executed, and the instructions decoded one-by-one to generate the control point signals necessary for carrying out the desired control operation. As mentioned above, this manner of processing internally generated control operations is quite time consuming, significantly lowering the overall average processing speed of the data processor.

SUMMARY OF THE INVENTION

In accordance with the invention, there is provided a microprogrammed data processor of the above-described type in which programmable logic array mechanisms responsive to processor instructions produce the various microwords used to execute program instructions, in which the overall processing speed is greatly enhanced by the addition of further programmable logic array mechanisms which generate sets of microwords used to execute system-initiated control operations. A wide input system encoding programmable logic array responds to input signals which instruct system-initiated control operations to generate an internal exception condition opcode. If more than one system-initiated control operation is requested at one time, the system encoding programmable logic array also is capable of prioritizing and sequencing the requests. A plurality, four in a preferred embodiment, of system decode programmable logic arrays operate in response to the internal exception condition opcode produced by the system encode programmable logic array to generate the microwords which in turn are used to generate the control point signals which directly control the operations of the processor devices such as the arithmetic logic unit, various registers, counters and the like, as needed to execute the requested system-initiated control operations. The four system decode programmable logic arrays in the preferred embodiment are operated in time sequence using a multiplexing structure to thus achieve a maximum processing speed.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 3 (3.1 and 3.2) is a functional block diagram of a previous microword control system used for producing control point signals only in response to instructions derived from a user's software program and for operating the data processor in a run mode; and FIG. 4 (4.1, 4.2, and 4.3) is a functional block diagram of a microword control system of the invention.

DESCRIPTION OF THE PREFERRED EMBODIMENTS

Figures 4, 41:
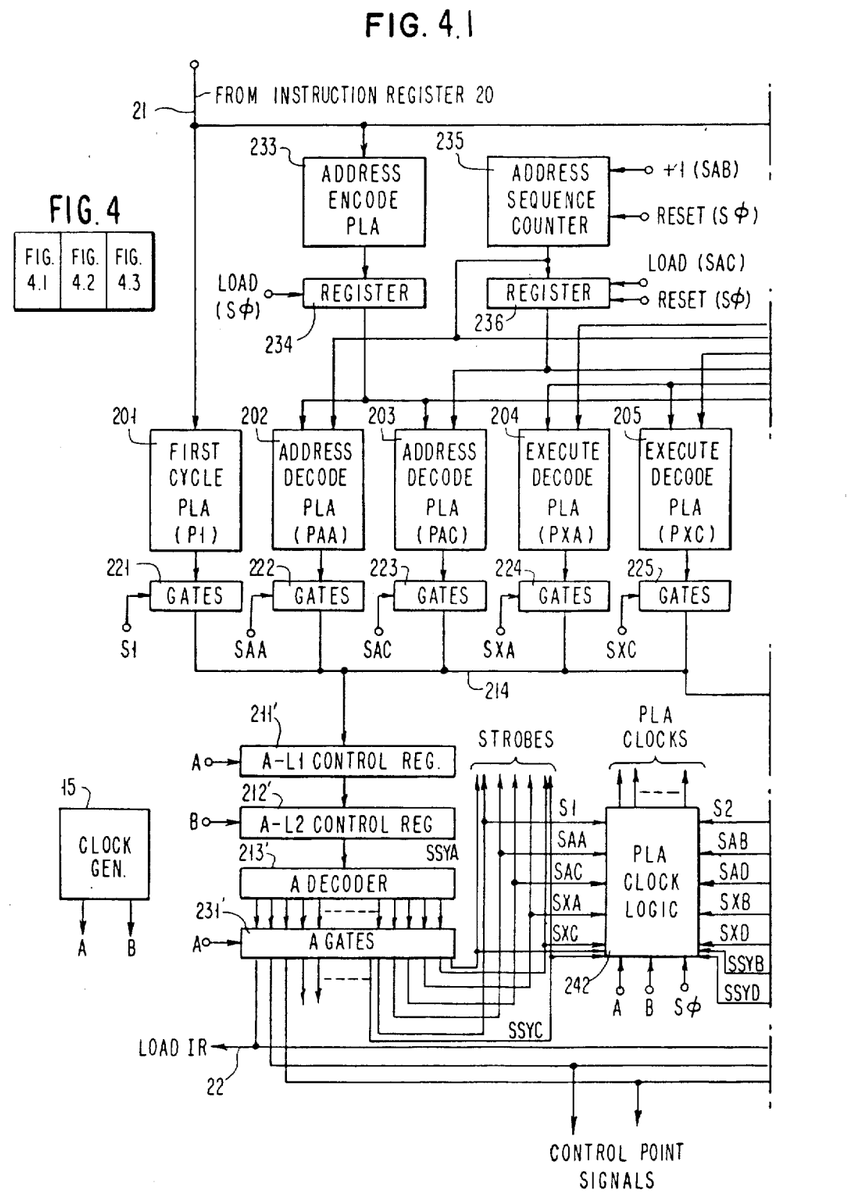
Figure 32:
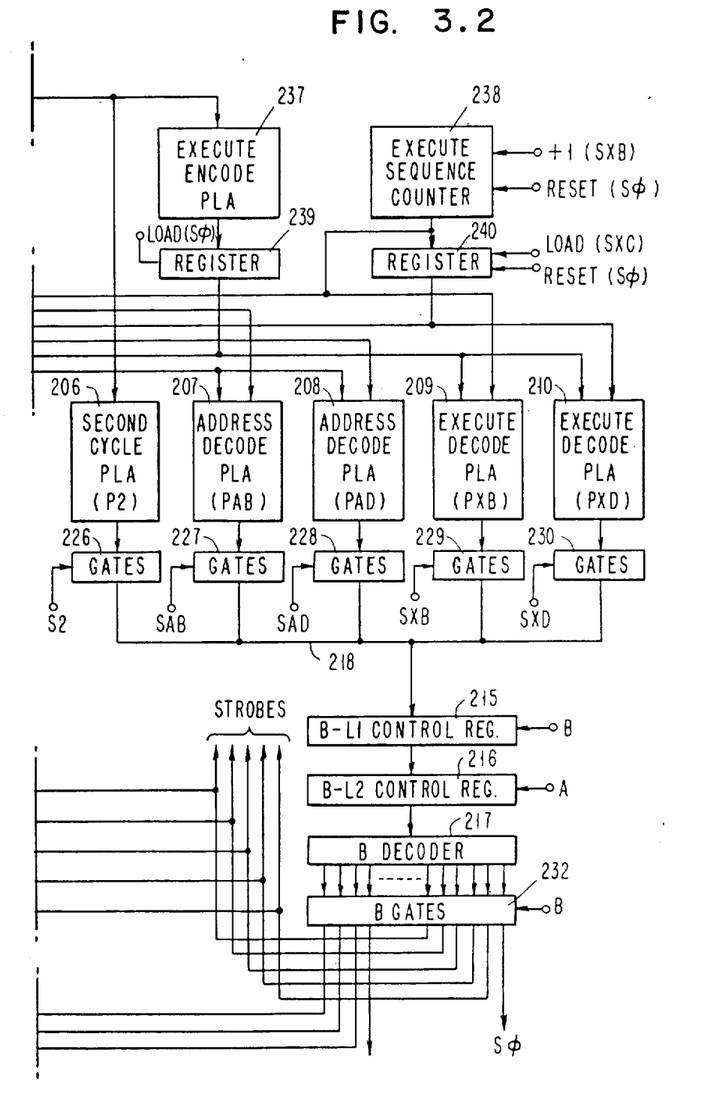
Figure 42:
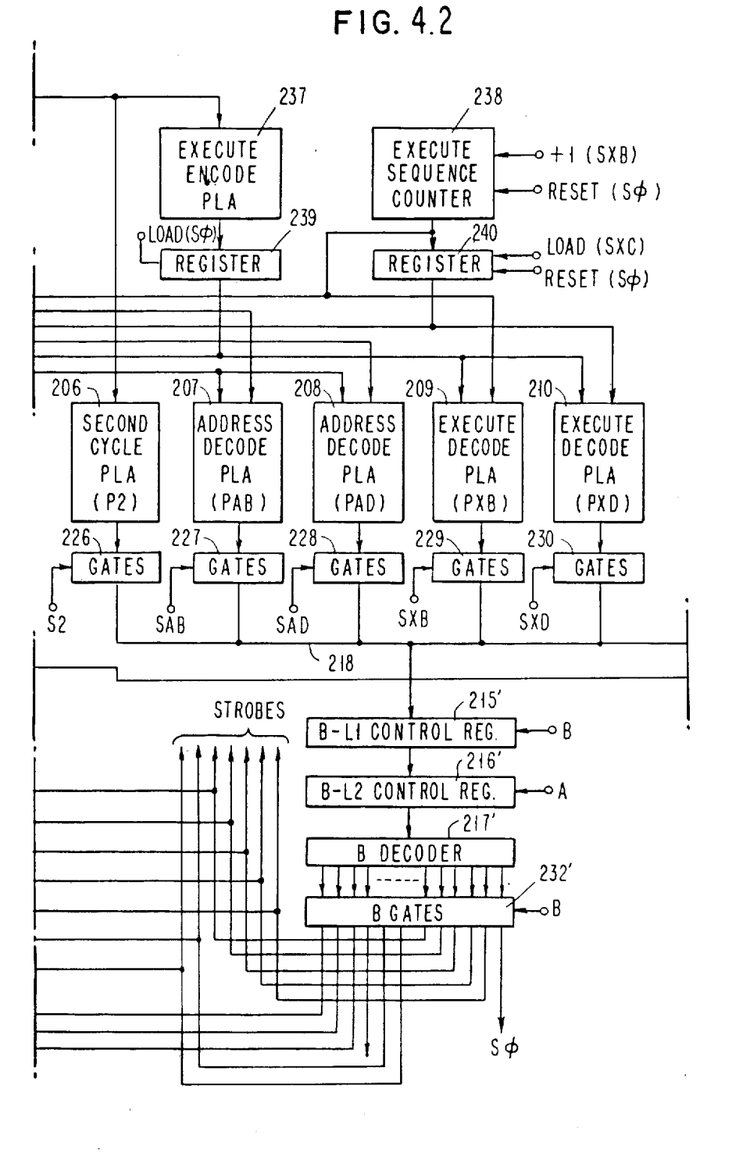
Figure 43:
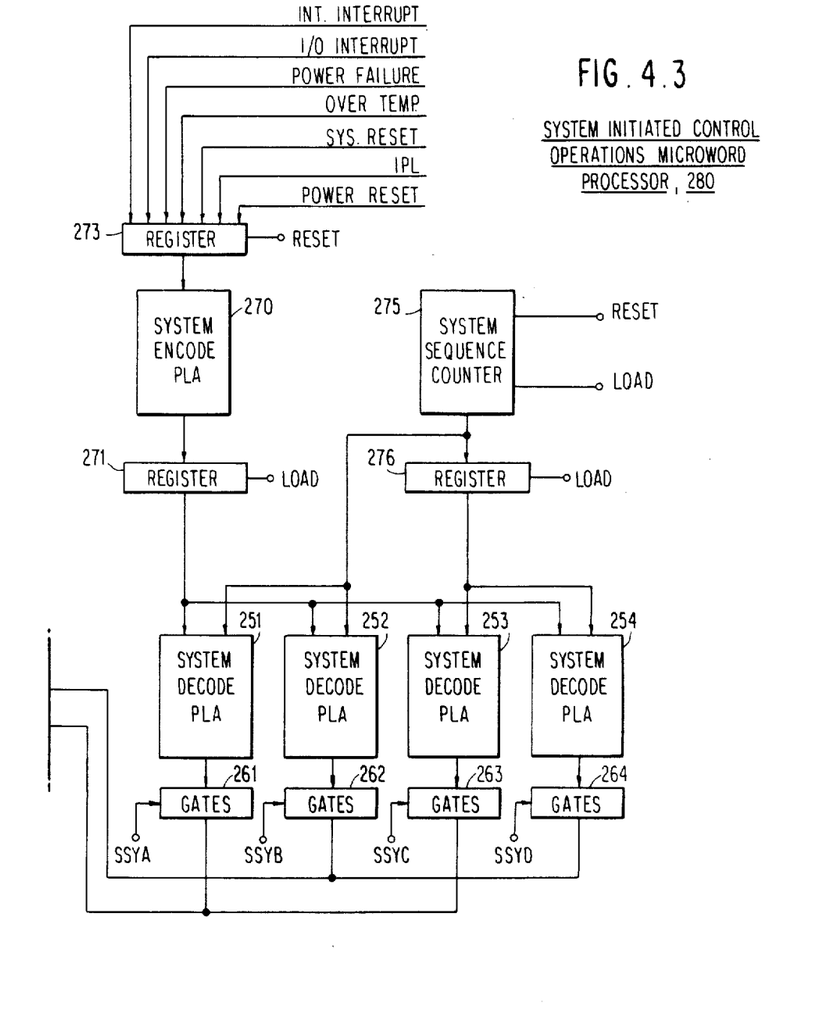

Referring now to FIG. 4, there is shown a functional block diagram of a microword control system embodying the present invention. This microword control system includes substantially the same components as the microword control system of FIG. 3 above, which system is capable of producing control point signals through programmable logic array mechanisms only in response to instructions derived from a user's software program, that is, only in the run mode of the data processor. In accordance with the invention, to this microword control system is added a further programmable logic array structure, specifically, a system-initiated control operations microword processor 280, which is used to generate control point signals in response to internally initiated control operations, which operations are typically carried out in other than the run mode of the data processor. Examples of the internally initiated control operations to which the microword processor 280 can respond are operations for stop, wait and load, error check, program check, machine check, stop-on-error, check-restart, interrupt-request, reset-interrupt, I/O interrupt, power failure or over-temperature shutdown, system reset, initial program loading (IPL) and power reset. The system initiated control operations with which the invention may be used or not, of course, limited to these particular operations, and they are given by way of example only.

Signals indicating that one of the system initiated control operations has been requested and should be carried out are applied as inputs to a register 273. These signals may be derived from various points within the data processor. For instance, sample latches and logic may be used to periodically sample operating states of the data processor to generate particular ones of the signals. Other ones of the signals may be available directly from an I/O buffer, an internal register, or the like. There may be, for instance, twenty to thirty or more of these signals applied to and stored in the register 273. The register 273 may, for example, be an S-R register in which, once a bit of the register has been set, it remains set until the register is cleared by the RESET signal.

The outputs of the register 273 are applied to a system encode programmable logic array 270. It is the purpose of the system encode programmable logic array 270 to convert the system initiated control operation signals supplied through the register 273 into an internal exception condition opcode and, if more than one system initiated control operation is requested at one time, to prioritize and properly sequence the requests. The system encode programmable logic array 270 is thus somewhat different in structure, although not in its basic mode of operation, from the addressing encode programmable array 233 for instance, in that the number of input bits to the system encode programmable logic array 270 is larger than the number of output bits, while the contrary can be true for the address encode programmable logic array 233. Nevertheless, the same basic programmable logic array structure may be used.

The opcodes produced by the system encode programmable logic array 270 are first stored in a register 271, and then applied to inputs of each of four system decode PLA's 251-254. A system sequence counter 275 and a register 276 supply sequences of number signals to second sets of inputs for the AND array portions of the PLA's 251-254 in substantially the same manner as the sequence counters 235 and 238 and their corresponding registers 236 and 240.

The microwords produced by the system decode PLA's 251-254 in response to the internal exception condition opcodes and the sequences of number signals are multiplexed through multiplexing circuitry composed of gates 261-264. The gates 261-264 are enabled by PLA strobes SSYA, SSYB, SSYC and SSYD, respectively. The outputs of the gates 261 and 263 are applied to the first PLA output bus 214, while the outputs from the gates 262 and 264 are applied to the second PLA output bus 218. The PLA strobes SSYA, SSYB, SSYC and SSYD are generated at the outputs of the A gates 231' and the B gates 232' in the same manner as the PLA strobes S1, SAA, SAC, etc. described above. Specifically, a microword produced by the system decode PLA 251, applied through the A decoder 213', generates the PLA strobe SSYC which enables the gates 263 associated with the system decode PLA 253. Thus, a microword outputted by the system decode PLA 251 is itself used to enable the next microword onto the appropriate PLA bus. In a similar fashion, a mnicroword generated by the system decode PLA 252 is used, through the B gates 232', to generate the PLA strobe SSYD, a microword generated by the system decode PLA 253 is used to generate the PLA strobe SSYA, and a microword generated by the system decode PLA 254 is used to generate the PLA strobe SSYB.

The system decode PLA's 251-254 may be similar in structure to the PLA's 202-205 and 207-210. That is, each of the system decode PLA's 251-254 may include an AND array portion responsive to the system initiated control operation to be performed and an OR array portion responsive to the AND array portion for producing at least one of the microwords needed to execute the control operation.

To construct the A-L1 control register 211', the A-L2 control register 212', the A decoder 213', the A gates 231', the B-L1 control register 215', the B-L2 control register 216', the B decoder 217' and B gates 232', it is only necessary that the like-named components (identified by the same reference numerals without a prime) shown in FIG. 3 be expanded to accommodate the additional signals.

With the addition of the above-described system-initiated control operations microword processor 280, the invention provides a remarkable increase in overall data processor speed. Specifically, the proportion of time used for processing system initiated control operations is very significantly reduced due to the very rapid processing of these control operations.

While there has been described what is at present considered to be the preferred embodiment of the invention, it will be obvious to those skilled in the art that various changes and modifications may be made therein without departing from the spirit and scope of the invention, and it is, therefore, intended to cover all such changes and modifications as fall within the true spirit and scope of the invention.

What is claimed is:

1. In a microprogrammed data processor wherein sequences of microwords are used to control the execution of processor instructions, some of said microwords being produced in response to software-initiated control instructions during a run mode of said data processor and others of said microwords being produced in response to hardware-initiated control instructions in a non-run mode of said data processor, an improved microword control system comprising:

a first plurality of programmable logic array mechanisms responsive to said hardware-initiated control instructions in a non-run mode of said data processor for producing first sequences of microwords for executing said instructions;

microword-responsive control circuitry for controlling operations of predetermined hardware elements of said data processor in response to said first sequences of microwords;

a second plurality of second programmable logic array mechanisms responsive to said software-initiated instructions in a run mode of said data processor for producing microwords for executing said software initiated instructions;

clock generation means for generating a plurality of sequences of clock pulses;

first multiplexing circuitry for supplying microwords from different ones of said first plurality of programmable logic array mechanisms to said control circuitry during respective ones of said clock pulse sequences; and second multiplexing circuitry for supplying microwords from different ones of said second plurality of programmable logic array mechanisms to said control circuitry during different respective time intervals.

2. The improved microword control system of claim 1, further comprising means for sequentially and cyclically operating ones of said first plurality of programmable logic array mechanisms in response to said instructions.

3. The improved microword control system of claim 1, wherein said microword-responsive control circuitry comprises first and second register means and first and second decoder means, said first and second decoder means being coupled to decode outputs of said first and second register means, respectively; and first and second buses, said first bus coupling a first set of outputs from said multiplexing circuitry means to an input of said first register means and said second bus coupling a second set of outputs of said multiplexing circuitry means to inputs of said second register means.

4. The improved microword control system of claim 1, further comprising a system encode programmable logic array having inputs coupled to receive signals indicative of ones of said hardware-initiated control operations to be performed, said system encode programmable logic array producing internal exception condition opcodes which are applied to inputs of said first plurality of programmable logic array mechanisms.

5. The improved microword control system of claim 4 further comprising:
   a first register for storing said signals applied to inputs of said system encode programmable logic array; and
   a second register for storing said internal exception condition opcodes produced by said system encode programmable logic array and applying said internal exception condition opcodes to said inputs of said programmable logic array mechanisms.

6. The improved microword control system of claim 1, further comprising sequence counter means for supplying a sequence of number signals for sequentially operating ones of said first plurality of programmable logic array mechanisms.

7. The improved microword control system of claim 6, wherein each of said microwords includes a portion indicative of a one of said first plurality of programmable logic array mechanisms from which a next subsequent microword is to be supplied; and wherein said multiplexing circuitry means comprises gating means operating in response to said portion of said microword.

* * * * *